US008611823B2

(12) United States Patent
Weng et al.

(10) Patent No.: US 8,611,823 B2
(45) Date of Patent: Dec. 17, 2013

(54) MOBILE GUIDED UPLINK INTERFERENCE MANAGEMENT

(75) Inventors: Jianfeng Weng, Kanata (CA); Andrew Mark Earnshaw, Kanata (CA); Xin Jin, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 7 days.

(21) Appl. No.: 13/162,447

(22) Filed: Jun. 16, 2011

(65) Prior Publication Data

US 2012/0322453 A1 Dec. 20, 2012

(51) Int. Cl.
 *H04W 88/02* (2009.01)
(52) U.S. Cl.
 USPC ...................................................... 455/63.1
(58) Field of Classification Search
 USPC ............. 455/63.1, 414.2, 450, 522, 501, 506, 455/509, 436–444; 370/310, 329, 328, 254
 See application file for complete search history.

(56) References Cited

U.S. PATENT DOCUMENTS

| | | | |
|---|---|---|---|
| 2010/0311452 A1* | 12/2010 | Li et al. | 455/509 |
| 2012/0147821 A1* | 6/2012 | Bertrand et al. | 370/328 |
| 2012/0155307 A1* | 6/2012 | Turk et al. | 370/252 |
| 2012/0281569 A1* | 11/2012 | Yamamoto et al. | 370/252 |
| 2013/0003580 A1* | 1/2013 | Kovacs et al. | 370/252 |

FOREIGN PATENT DOCUMENTS

| | | |
|---|---|---|
| WO | WO2009055619 A1 | 4/2009 |
| WO | WO2009047740 A3 | 5/2009 |
| WO | WO2009132133 A1 | 10/2009 |
| WO | WO2010086734 A1 | 8/2010 |
| WO | WO2010105231 A1 | 9/2010 |

OTHER PUBLICATIONS

Liu et al.; "An Overload Indicator and High Interference Indicator Hybrid Scheme for Inter-Cell Interference Coordination in LTE Systems"; 2010 3rd IEEE International Conference on Broadband Network and Multimedia Technology (IC-BNMT); Oct. 26-28, 2010; pp. 514-518.
Zhang et al.; "A Novel Uplink Interference Coordination Scheme Using High Interference Indicator"; 2010 IEEE 72nd Vehicular Technology Conference Fall (VTC 2010-Fall); Sep. 6-9, 2010; pp. 1-5.
International Search Report and Written Opinion of the International Searching Authority issued in International Application No. PCT/CA2011/050366 on Mar. 14, 2012; 10 pages.
International Preliminary Report on Patentability issued in U.S. Appl. No. PCT/CA2011/050366 on Sep. 27, 2013; 7 pages.

\* cited by examiner

*Primary Examiner* — Diane Mizrahi
(74) *Attorney, Agent, or Firm* — Fish & Richardson P.C.

(57) ABSTRACT

Systems and methods can be implemented on a user device and eNBs to manage uplink interference. A user device associated with a serving base station may detect downlink interference from one or more interfering base stations that are different from the serving base station. The user device that detects downlink interference can determine an uplink radio resource set from a plurality of predefined uplink radio resource sets based, at least in part, on the detected downlink interference. The user device can then transmit to the serving base station a radio resource indication identifying the determined uplink radio resource set to facilitate uplink interference management.

14 Claims, 11 Drawing Sheets

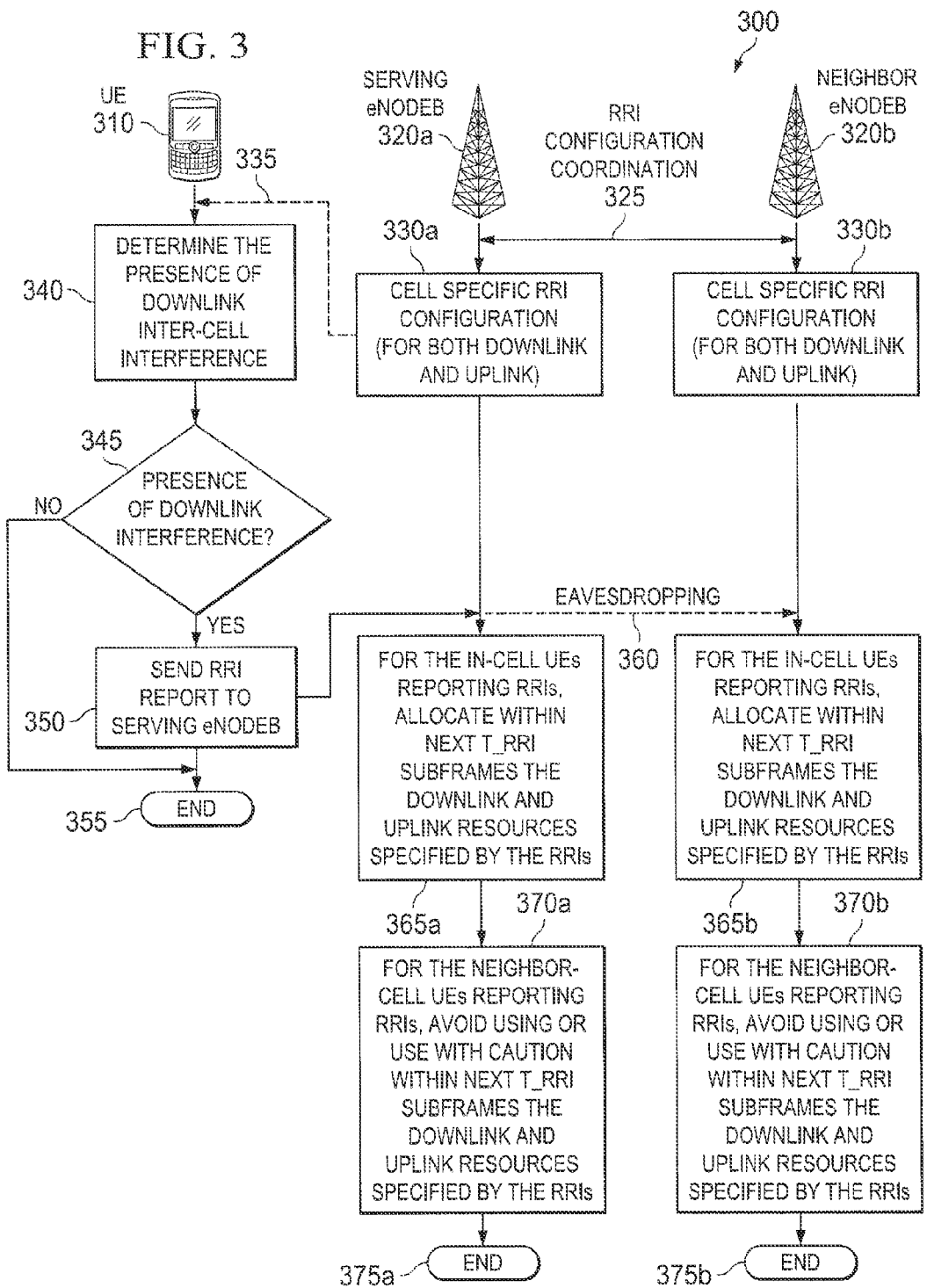

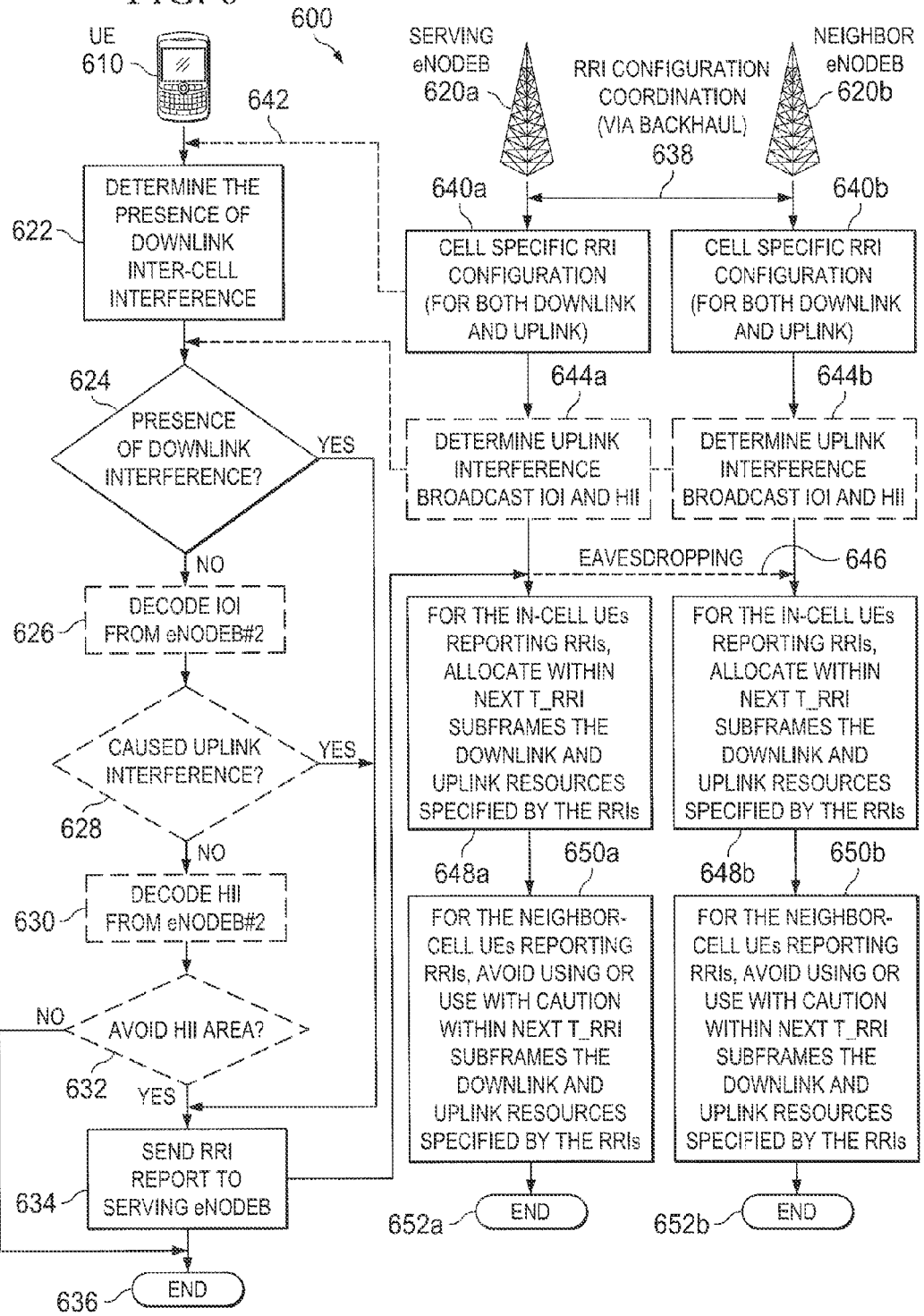

MOBILE GUIDED UPLINK INTERFERENCE MANAGEMENT

TECHNICAL FIELD

This invention relates to wireless communications and, more particularly, to managing mobile uplink interference.

BACKGROUND

In 3GPP LTE system, uplink inter-cell interference is coordinated between a serving evolved Node B (eNB), i.e., a serving base station, and its intra-frequency neighbouring eNBs via communicating over the X2 interface an uplink (UL) Interference Overload Indication (IOI) (Sec.9.2.17 of TS36.423) and a UL High Interference Indicator (HII) (See Sec.9.2.18 of TS36.423). IOI is to notify neighbouring eNBs the frequency locations over which the uplink interference level is too high (overloaded). HII is to notify neighbouring eNBs the frequency locations over which UL data scheduled by the serving eNB are sensitive to high interference. However, as the approaches with IOI and HII do not identify specific mobiles which cause UL interference, a proactive measure will normally be taken at each eNB to limit the uplink data transmission of all in-cell mobiles which may cause UL interference to other cells.

DESCRIPTION OF DRAWINGS

FIG. 3 is a diagram showing an example process of mobile-guided uplink interference management based on downlink interference determined at UE.

FIG. 6 is a diagram showing an example process of a UE sending dedicated combined downlink/uplink radio resource indication (RRI) based on downlink interference and control signals.

Like reference symbols in the various drawings indicate like elements.

DETAILED DESCRIPTION

Figure 1:
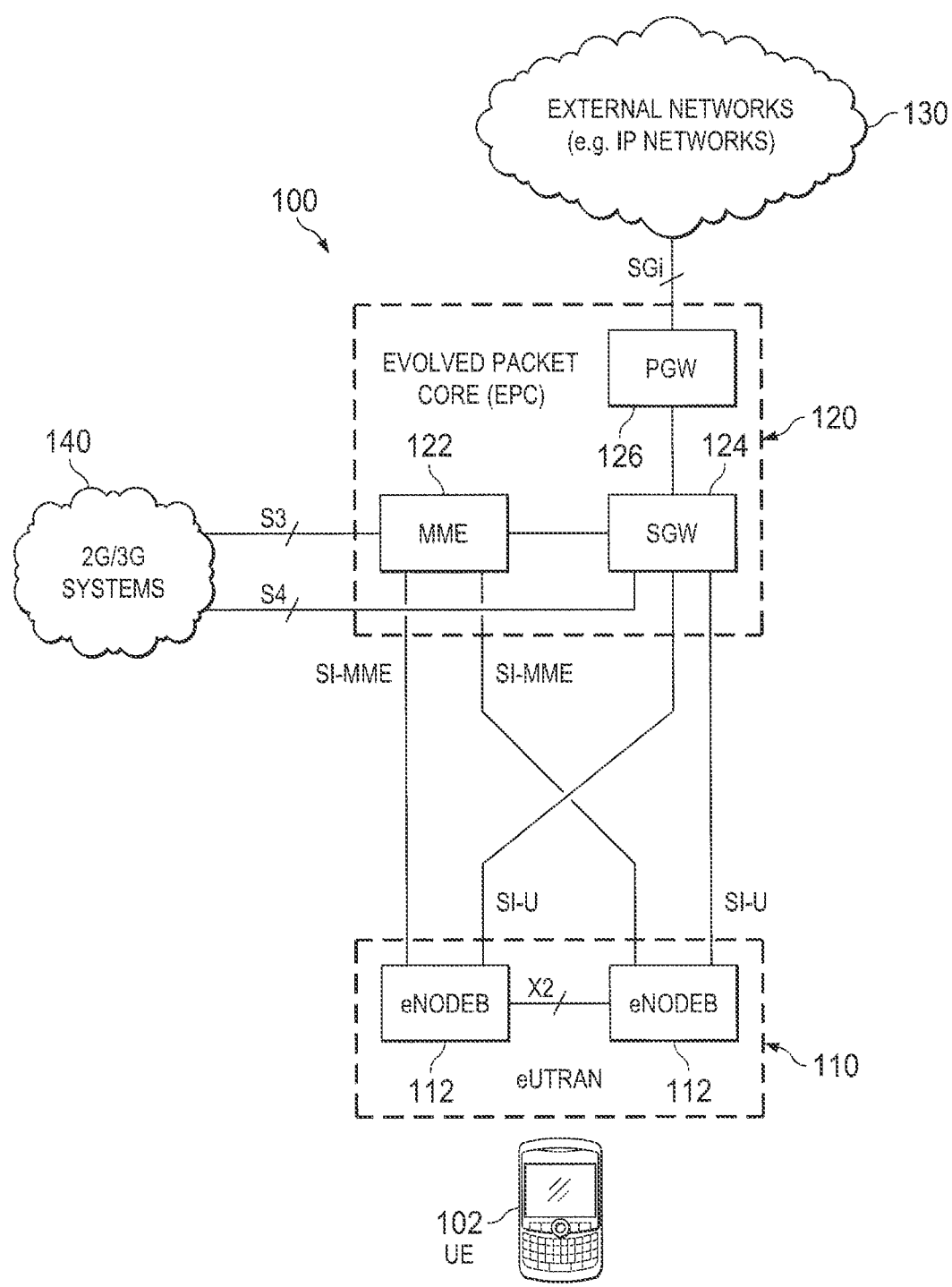
FIG. 1 is a schematic representation of an example wireless cellular communication system based on 3GPP long term evolution (LTE).

The present disclosure provides for systems, methods, and apparatuses relating to wireless communications and, more particularly, to managing mobile uplink (UL) interference. In some aspects, mobile electronic devices operating in a cell of a serving base station may experience downlink (DL) interference from neighbouring base stations and/or other sources operating in substantially similar spectrum. A mobile electronic device that is subject to DL interference may be more likely located at the edge of a cell (or at cell edge), where the signal strength for signals from the serving base station and interfering neighbouring base stations detected at the mobile electronic device are on similar scale. Similarly, the UL signal sent from the mobile electronic device is detected by the serving base station and the interfering neighbouring base station with similar signal strength. Accordingly, a mobile electronic device that experiences DL inter-cell interference may be more likely to cause UL inter-cell interference. In some implementations, when a mobile electronic device determines that it experiences DL interference, the device may alert the base stations of such interference by providing reports to the base stations. The reports may include an indication to request utilization of a preferred radio resource set or subset by providing a preferred radio resource set indication to the serving base station. Serving base stations may prescribe one or more preferred radio resource subsets for the mobile electronic device based on the received indication. The one or more preferred radio resource subsets may be used for UL and/or DL transmission. The neighbouring base stations may eavesdrop on or otherwise receive the reports sent by the mobile electronic device and may substantially avoid using or use with caution the UL and/or DL resources indicated by the preferred radio resource set or subset.

In some aspects, base stations may broadcast UL interference overload indication (IOI) and/or UL high interference indicator (HII) over wireless channel(s). The IOI can include information descriptive of frequency locations over which the UL interference level is above a specified threshold. For example, an eNB may measure the signal-to-interference-plus-noise ratio (SINR) of received uplink signals, and determine that the SINR for particular frequency locations is too low (i.e. below a specified threshold), which would therefore imply that the observed interference level for those frequency locations was too high. An eNB may also measure background interference plus noise power levels for all frequency locations and compare the measured power levels with a thermal noise reference power level and determine if the interference rise-over-thermal for particular frequency locations is too high (i.e., above a specified threshold), which would also imply that the observed interference level for those frequency locations was too high. The thermal noise reference power level could be obtained for example by measuring the background interference plus noise power level at night when the network is lightly loaded and the interference power level is low. The HII can include information descriptive of frequency locations over which UL data scheduled by the serving base station are sensitive to high interference. For example, if the eNB has identified cell-edge UEs (this could be accomplished through measurement reports or observing that uplink signals received from a UE have a low SINR), then uplink transmissions scheduled for a cell-edge UE may be expected to be sensitive to interference. An eNB may also identify certain frequency locations at which high order Quadrature Amplitude Modulation (QAM) with high data rate has been scheduled and the resulting reception performance is susceptible to interference as sensitive-to-interference frequency locations. A mobile electronic device can receive IOI and HII from all intra-frequency base stations within signal transmission range, identify the frequency locations indicated in the IOI and/or HII and determine, based on its UL data transmission history, whether it is a UL interfering mobile (i.e., a mobile electronic device that may have caused UL interference to neighbouring base stations and/or may need to avoid frequency locations indicated in the HII) for one or more upcoming UL transmissions.

The mobile electronic devices described above may operate in a cellular network, such as the network shown in FIG. 1, which is based on the third generation partnership project (3GPP) long term evolution (LTE), also known as Evolved Universal Terrestrial Radio Access (E-UTRA). More specifically, FIG. 1 is a schematic representation of an example wireless cellular communication system 100 based on 3GPP long term evolution. The cellular network environment 100 shown in FIG. 1 includes a plurality of base stations 112. In the LTE example of FIG. 1, the base stations are shown as evolved Node B (eNB) 112. It will be understood that the base station may operate in any mobile environment including femto cell, pico cell, or the base station may operate as a node that can relay signals for other mobile and/or base stations. Base stations 112 can communicate with one or more mobile electronic devices 102 wirelessly. Base stations 112 may also communicate with each other by X2 communication interfaces, described in more detail below. The example LTE telecommunications environment 100 of FIG. 1 may include one or a plurality of radio access networks 110, core networks (CNs) 120, and external networks 130. In certain implementations, the radio access networks may be Evolved Universal Mobile Telecommunications System (UMTS) terrestrial radio access networks (EUTRANs). In addition, in certain instances, core networks 120 may be evolved packet cores (EPCs). Further, there may be one or more mobile electronic devices 102 operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

The EUTRAN 110 comprises EUTRAN evolved NodeBs (eNBs) 112, which are to be understood as evolved base transceiver stations or base stations. The eNBs 112 communicate directly to the user equipment (UE) 102. UE 102 may be any mobile electronic device used by an end-user to communicate, for example, within the telecommunications environment 100. The UE 102 may be referred to as a mobile electronic device, user device, mobile station, subscriber station, or wireless terminal. UE 102 may be a cellular phone, personal data assistant (PDA), smartphone, laptop, tablet personal computer (PC), or other wireless communications device. Further, UEs 102 may include pagers, portable computers, Session Initiation Protocol (SIP) phones, one or more processors within devices, or any other suitable processing devices capable of communicating information using a radio technology. UE 102 may communicate directly with a serving base station to receive service when UE 102 is operated within the cell associated with the corresponding serving station. UE 102 may also receive radio signals from base stations neighbouring the serving base station.

Figure 2:
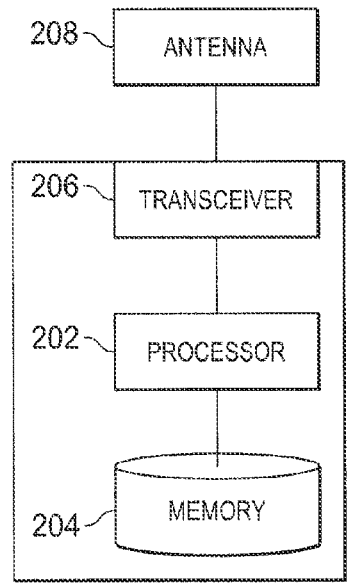
FIG. 2 is a schematic representation of the architecture of an example user equipment (UE).

Turning briefly to FIG. 2, each UE 102 may be any electronic device operable to receive and transmit wireless signals in the LTE telecommunication system 100. FIG. 2 is a schematic illustration of an example mobile electronic device (or UE) 102. UE 102 may include a processor 202, a memory 204, a wireless transceiver 206, and an antenna 208. The processor 202 may comprise a microprocessor, central processing unit, graphic control unit, network processor, or other processor for carrying out instructions stored in memory 204. The functions of the processor 202 may include computation, queue management, control processing, graphic acceleration, video decoding, and execution of a sequence of stored instructions from the program kept in the memory module 204. In some implementations, the processor 202 may also be responsible for signal processing including sampling, quantizing, encoding/decoding, and/or modulation/demodulation of the signal. The memory module 204 may include a temporary state device (e.g., random-access memory (RAM)) and data storage. The memory module 204 can be used to store data or programs (i.e., sequences of instructions) on a temporary or permanent basis for use in a UE. The wireless transceiver 206 can include both the transmitter circuitry and the receiver circuitry. The wireless transceiver 206 may be responsible for up-converting a baseband signal to a passband signal or vice versa. The components of wireless transceiver 206 may include a digital to analog converter/analog to digital converter, amplifier, frequency filter and oscillator. The antenna 208 is a transducer which can transmit and/or receive electromagnetic waves. Antenna 208 can convert electromagnetic radiation into electric current, or vice versa. Antenna 208 is generally responsible for the transmission and reception of radio waves, and can serve as the interface between the transceiver 206 and the wireless channel.

UE 102 may receive broadcast signals including IOI, HII from substantially all "visible" intra-frequency base stations and interference from base stations neighbouring a serving base station. Antenna 208 may receive control signals, user data and interference from the base stations and/or other sources operating in substantially similar spectrums and provide signals including control signals, user data and interference to the transceiver 206. Processor 202 may process the received signal, distinguishing between the interference and the desired signal from the serving base station. The level of interference can be determined by the processor 202. While the following discussion is directed toward inter-cell interference, the UE 102 may analyze other interference included from other sources operating in substantially similar spectrums without departing from the scope of the disclosure. In other words, when interference is discussed with respect to adjacent base stations, the disclosure covers interference from any device operating in substantially similar spectrum. For example, a certain percentage of the interference (e.g., 99%, 95%, 90%) may be generated by the adjacent base stations while another percentage (1%, 5%, 10%) may be generated by other devices. The level, or degree, of inter-cell interference may depend on the probability of radio resource collision (i.e. multiple base stations transmitting on the same radio resource) and the signal to interference and noise ratio (SINR) in the presence of a resource collision.

Based on the level of interference detected by the UE 102, and/or the frequency locations indicated in the IOI and HII, the processor 202 may generate a report that may be transmitted to the serving base station as well as to neighbouring base stations. The report may include a preferred radio resource indication (RRI) for the upcoming UL and/or DL transmissions. Here a radio resource set is defined as a combination of at least one of forthcoming time, frequency, or fixed beam locations which specify radio resources that can be used to carry DL traffic. The RRI can indicate a preferred radio resource set or subset. In some instances, the RRI is transmitted to alert the base stations that the UE 102 has detected DL interference, so that the UE may have greater potential to cause UL interference. In some instances, the RRI is transmitted when the UE 102 has determined that it may be responsible for causing UL interference to neighbouring base stations, or that its own UL signal to the serving base station may be corrupted by UL interference. In some implementations, the processor 202 can also generate measurement reports of the detected interference level and transmit them via transceiver 206 to the serving base station to alert the serving base station that a radio resource indication is forthcoming. All or portions of the measurement report or information derived from the measurement report may be sent to the neighbouring base stations to provide an estimated time of arrival of the RRI, which alleviates the neighbouring base stations from having to constantly search for any RRI from UEs 102 not operating within their respective cells.

Returning to the illustration of FIG. 1, functionally, the UEs 102 may be used as a platform for different applications of communications. For example, the UEs 102 may be used for interacting with the cellular network by transmitting/receiving signals for initiating, maintaining or terminating the communications which the end-user requests. The UE 102 may also include mobility management functions such as handovers and reporting the location, and in these the UE 102 performs as instructed by the cellular network. One exemplary function of the UE 102 may be to provide the user interface to the end-user so that applications such as voice calls, data transmission or web browsing may be implemented.

In some implementations, UEs 102 may transmit in one or more cellular bands. One or multiple UEs 102 may be communicably coupled to the eNBs 112. In these cases, messages transmitted and/or received by UEs 102 may be based on a multiple access technology. In some implementations, the UEs 102 are configured to use orthogonal frequency division multiple access (OFDMA) technology or single carrier—frequency division multiple access (SC-FDMA) technology to communicate with the eNBs 112. In some other implementations, eNBs 112 may also accommodate UEs 102 using multiple access technologies such as time division multiple access (TDMA), frequency division multiple access (FDMA) and code division multiple access (CDMA).

The UEs 102 may transmit voice, video, multimedia, text, web content and/or any other user/client-specific content. On the one hand, the transmission of some of these contents, e.g., video and web content, may require high channel throughput to satisfy the end-user demand. On the other hand, the channel between the UEs 102 and eNBs 112 may be contaminated by multipath fading, due to the multiple signal paths arising from many reflections in the wireless environment. In some implementations, the UEs 102 and/or eNBs 112 may also be equipped with multiple antennas to take advantage of multiple-input-multiple-output (MIMO) technology. MIMO technology may provide a process to utilize the multiple signal paths to reduce the impact of multipath fading and/or to improve the throughput. By using multiple antennas at the UEs 102 and/or eNBs 112, MIMO technology may enable the system to set up multiple parallel data streams on the same channel, thereby increasing the throughput of the channel. In short, UEs 102 generate requests, responses or otherwise communicate in different means with Enhanced Packet Core (EPC) 120 and/or Internet Protocol (IP) networks 130 through one or more eNBs 112.

A radio access network is part of a mobile telecommunication system which implements a radio access technology, such as UMTS, CDMA2000 and 3GPP LTE. In many applications, the Radio Access Network (RAN) included in a LTE telecommunications system 100 is called an EUTRAN 110. The EUTRAN 110 can be located between the UEs 102 and EPC 120. The EUTRAN 110 includes at least one or a plurality of eNBs 112. The eNB can be a radio base station that may control all or at least some radio related functions in a fixed part of the system. At least one eNB 112 or a plurality of eNBs 112 provide radio interface within their coverage area or a cell for the UEs 102 to communicate. eNBs 112 may be distributed throughout the cellular network to provide a wide area of coverage. The eNB 112 directly communicates to one or a plurality of UEs 102, other eNBs 112, and the EPC 120.

In some implementations, the eNB 112 may be in a one-to-many relationship with the UE 102, i.e., the eNB 112 may serve multiple UEs 102 within its coverage area, but each UE 102 may be connected to only one eNB 112 at a time. In some implementations, the eNB 112 may be in a many-to-many relationship with the UE 102, i.e., multiple UEs 102 are connected to multiple eNBs 112. The eNB 112 may be connected to other eNBs 112 with which a handover may be applied.

The eNBs 112 communicate between each other through X2 interfaces. One of the main functions of the X2 interface is for support of handover. The eNBs 112 may communicate with each other across the X2 interface to engage in interference management based on reports received from UE 102. For example, a serving base station may provide all or portions of a UE's measurement report or information derived from that measurement report to an interfering base station (or to all or at least some neighbouring base stations) to provide an estimated time of arrival for a radio resource indication. The UE 102 may transmit the measurement report when it detects a neighbouring base station. The measurement report provides an estimated time of arrival for the radio resource indication from the UE, though the transmittal of a measurement report does not necessarily mean that a radio resource indication will be transmitted. The radio resource indication is transmitted in certain instances where the UE 102 detects interference of a certain level. In addition, in certain instances, the radio resource indication may be provided when the detected interference and/or noise levels are too high such that the UE 102 cannot achieve a desirable connection with the serving base station.

In certain implementations, measurement reports, information derived from measurement reports, UE registrations, and/or UE registration updates are provided to neighbouring base stations to provide an estimated time of arrival of the radio resource indication, which the neighbouring base stations may receive directly from the UE 102. In certain instances, the neighbouring base stations may be constantly searching for the radio resource indications from user devices. This constant searching may waste base station resources. By providing an estimated time of arrival for the radio resource indication, the serving base station provides an indication of a time interval during which the neighbouring base station may search for a radio resource indication.

The eNB 112 may be the end point of the radio protocols towards the UE 102 and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others.

FIG. 3 is a diagram showing an example process 300 of mobile-guided uplink interference management based on DL interference determined at UE. In some implementations, the UE can perform UL interference coordination based on the reuse of the mobile preferred radio resource indication (RRI). For example, base stations can define DL and UL radio resource sets, the radio resource sets may be defined using dimensions of time, frequency, and/or antenna beam. The radio resource sets across neighbouring base stations may not overlap with each other. Further, a DL radio resource set and its corresponding UL radio resource set may not use the same frequency subband and/or may not use the same time slot. Note that an RRI may be determined solely based on the DL interference seen by a mobile. A summary of the example process 300 is given below.

In the example shown in FIG. 3, a UE 310 is located in a cell served by its serving eNB 320a. In some instances, the UL signal transmitted from UE 310 intended for its serving eNB 320a may cause interference at neighbouring eNB 320b. For example, the UE 310 may be at a cell-edge between the serving eNB 320a and the neighbouring eNB 320b, and the UE's UL signal may cause interference to the UL signal of another UE served by the neighbouring eNB 320b using the same UL resource blocks. Note that although only one neighbouring eNB 320b is shown in this example 300, there may be multiple neighbouring eNBs experiencing UL interference from the UE 310. At 325, the RRI configuration coordination is performed at the serving eNB 320a and the neighbouring eNB 320b via backhaul. Cell-specific RRI configuration for both UL and DL can be performed by the serving eNB 320a at 330a and by the neighbouring eNB 320b at 330b. To make the RRI configuration known to the in-cell UEs, broadcasting 335 can be performed by the serving eNB 320a since the information to be delivered can be common to the UEs in the service area. Similarly, the neighbouring eNB 320b can also broadcast the RRI configuration to its in-cell UEs.

At 340, the presence of DL inter-cell interference can be determined at a UE 310. In some instances, a UE that sees DL inter-cell interference may have greater potential to cause UL inter-cell interference, since it is more likely to be a cell-edge UE. The UE 310 decides whether there is presence of DL interference at 345. If the UE 310 detects the presence of DL inter-cell interference, at 350, it can indicate to its serving base station a mobile-preferred DL radio resource set and a corresponding UL radio resource set. Both sets may be chosen together by a dedicated combined DL/UL RRI. If the UE 310 does not see any DL inter-cell interference, it may not send any RRI, and the UE process ends at 355. Note that the RRI sent by a UE can indicate a DL radio resource set and/or a corresponding UL radio resource set.

At the eNB side, the RRI from the UE 310 may be intended to the serving eNB 320a. However, the neighbouring eNB 320b may eavesdrop on or otherwise receive the RRI at 360. Upon the reception of RRIs from the UE 310, the serving eNB 320a and the neighbouring eNB 320b can perform DL and UL scheduling accordingly. In particular, at 365a, for the in-cell UEs reporting RRIs, the serving eNB 320a may try to allocate to the in-cell UEs within the next T_RRI subframes (T_RRI subframes may be a set of consecutive 1 ms subframes for the effective time interval of RRIs) the DL and UL resources specified by the RRIs received from the respective in-cell UEs. Here, T_RRI can represent the effective time interval of each RRI. For the neighbor-cell UEs reporting RRIs to the neighbouring eNB 320b, the RRIs can be eavesdropped and decoded at the serving eNB 320a. At 370a, the serving eNB 320a can use those decoded RRIs as constraints within the next T_RRI subframes when the serving eNB 320a may allocate DL and UL resources for the in-cell UEs that are not reporting RRIs. More specifically, for the DL scheduling, the constraints may be used to avoid using the DL radio resources specified by the dedicated RRIs from neighbouring-cell UEs or to use those resources with DL transmit power change limited as indicated in the dedicated RRIs from neighbouring-cell UEs. For the UL scheduling, the constraints may be used to avoid using the UL radio resources specified by the dedicated RRIs from neighbouring-cell UEs or to use those for the in-cell UEs which can tolerate potential UL inter-cell interference. In some instances, a dedicated RRI can carry a field for a DL transmit power change limit. In some implementations of the present application, it can be assumed that the RRI does not carry any field for an UL transmit power change limit. The process for the serving eNB 320a ends at 375a. The neighbouring eNB 320b can perform substantially similar operations with, respectively, 365a, 370a and 375a, at 365b, 370b and 375b.

Figure 4:
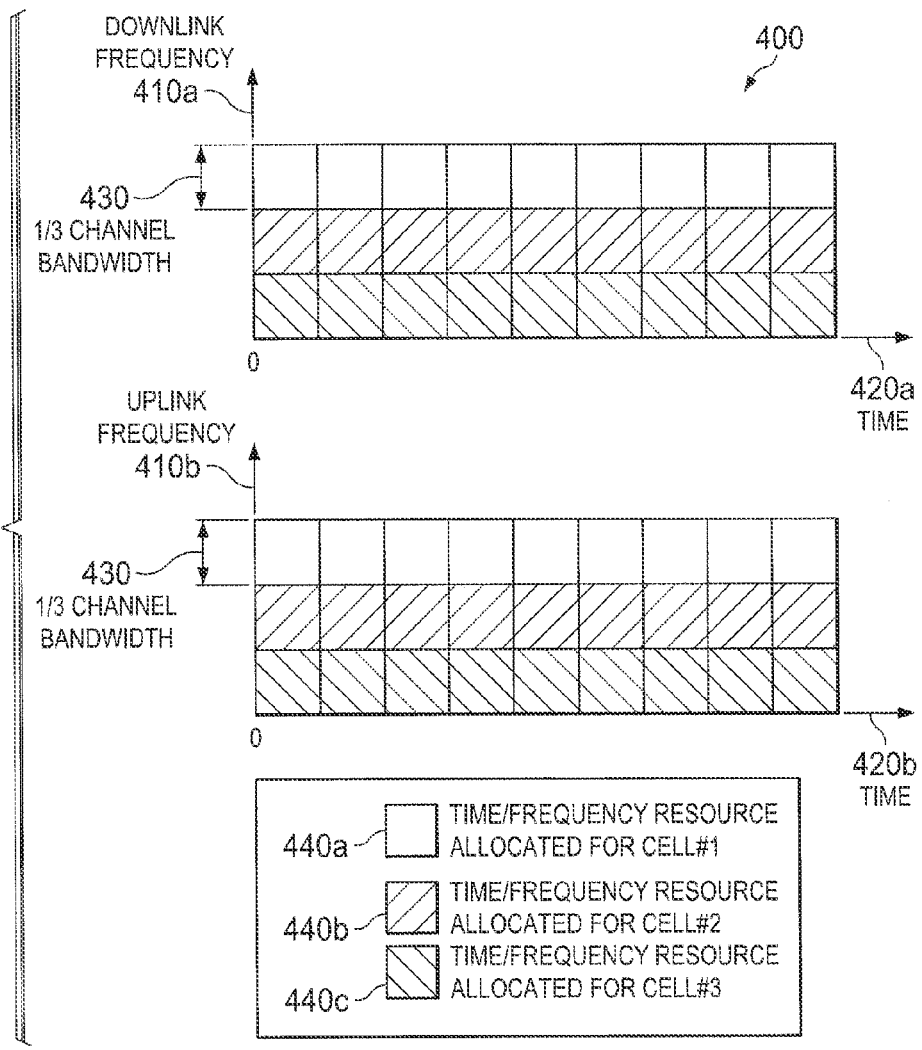
FIG. 4 is a diagram showing an example of downlink and uplink radio resource reuse.

FIG. 4 is a diagram showing an example 400 of downlink and uplink radio resource reuse. In the example 400 shown in FIG. 4, DL radio resource (DL frequency 410a and time 420a) and UL radio resource (UL frequency 410b and time 420b) for cell 440a, cell 440b and cell 440c each occupy in the frequency direction ⅓ of the available channel bandwidth 430. Note that in this particular example 400, there is only one selection of RRI for UEs in the same cell and each UE will decide whether or not to send an RRI. This implementation may make the selection of an RRI at the UE side simple and keeps the option open for an eNB to group multiple UEs to share a wide range of radio resources specified by the RRI. In some implementations, the eNBs may partition time frequency resources into smaller radio resource units and allow each UE to choose a smaller unit as its preferred radio resource.

Figure 5:
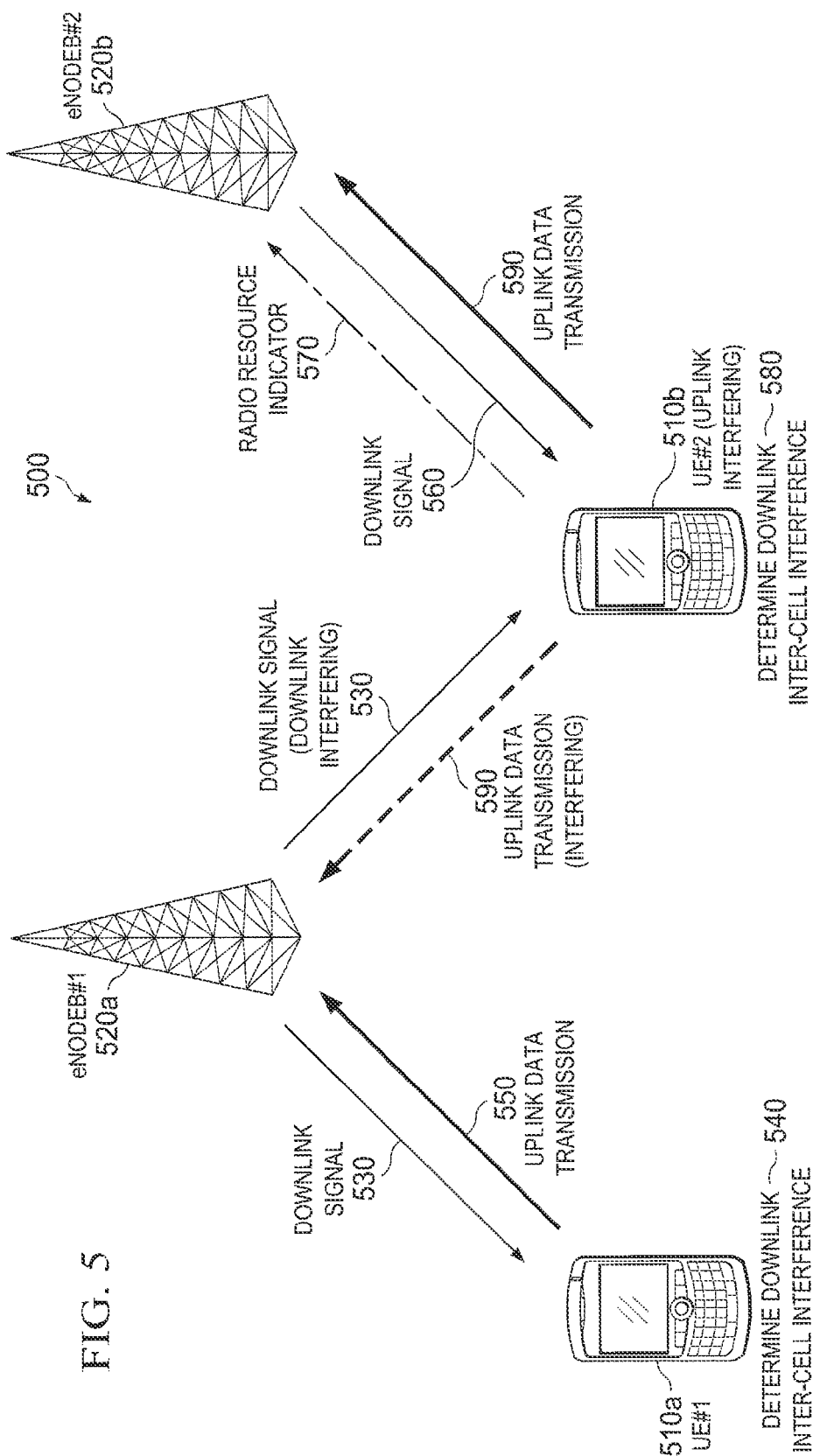
FIG. 5 is a diagram showing an example of uplink interference coordination based on determining downlink interference at UE.

FIG. 5 is a diagram showing an example 500 of uplink interference coordination based on determining DL interference at UE. There are two UEs and two eNBs shown in this example 500, i.e., UE 510a, UE 510b, eNB 520a and eNB 520b. UE 510a is served by eNB 520a, and is far away from eNB 520b relative to eNB 520a. As such, the UL interference caused by UE 510a at eNB 520b may be negligible. UE 510b is located at the cell-edge between eNB 520a and eNB 520b and is served by eNB 520b. Since UE 510b is in the cell-edge between eNB 520a and eNB 520b, if the UL/DL radio resources are reused by eNB 520a and eNB 520b, eNB 520a may cause DL interference at UE 510b, and UE 510b may cause UL interference at eNB 520a. In the example coordination process 500, eNB 520a can broadcast DL signal and the RRI configuration at 530, and eNB 520b broadcasts DL signal and the RRI configuration at 560. In some instances, to make the RRI configuration known to all mobiles in a cell, an eNB may need to broadcast the RRI configuration since that is common to all UEs. Point to point communication of the RRI configuration may be possible when a similar message is transmitted to each UE. The DL/UL radio resource reuse plan adopted may be the plan illustrated in the description of FIG. 4. At 540, UE 510a can determine the presence of DL inter-cell interference. Similarly, at 580, UE 510b can determine the presence of DL inter-cell interference. In the example 500 shown in FIG. 5, UE 510b may see DL interference and send an RRI at 570. UE 510b may transmit to eNB 520b an RRI requesting the time/frequency radio resources 440b to use for T_RRI subframes as shown in FIG. 4. UE 510a may not see any DL interference, so UE 510a may not send any RRI, and proceed with regular UL data transmission at 550. Upon the reception of RRIs from UEs, eNBs may do DL and UL scheduling accordingly. In this example implementation 500, we focus on the UL scheduling. At eNB 520b, once eNB 520b decodes the RRI from UE 510b, eNB 520b may try to allocate within the next T_RRI subframes for UE 510b the resources requested from the time/frequency radio resources 440b as shown in FIG. 4. For other UEs (not shown) served by eNB 520b, eNB 520b can allocate freely all the available radio resources (including unused resources in the radio resources 440b). At eNB 520a, once eNB 520a decodes the RRI from UE 510b, eNB 520a may try within the next T_RRI subframes to avoid using the radio resources 440b or to arrange a high interference tolerable UL transmission in radio resources 440b. In other words, UEs served by eNB 520a (UE 510a for example) can freely use the radio resources other than radio resource 440b, and/or they can also use radio resource 440b if their UL signals can tolerate potential interference from UE 510b. In some instances, eNB 520a may just use the RRI from UE 510b as a scheduling constraint and eNB 520a may not do scheduling for UE 510a. At 590, UE 510b may proceed with regular UL data transmission based on the indicated radio resources.

FIG. 6 is a diagram showing an example process 600 of UE sending dedicated combined downlink/uplink RRI based on downlink interference and control signals. In this implementation, UL interference management may also be achieved by reusing the UE preferred RRI. However, an RRI sent by a UE may be determined based on the DL interference seen by the UE as well as the UL interference indication from base stations. In the present disclosure, we focus on the UL interference indication from base stations. Similar to the example shown in FIG. 3, in this example 600, the UL signal transmitted from UE 610 intended for its serving eNB 620a may cause interference at neighbouring eNB 620b. Note that although only one neighbouring eNB 620b is shown in this example 600, there may be multiple neighbouring eNBs experiencing UL interference from the UE 610. At 638, the RRI configuration coordination is performed at the serving eNB 620a and the neighbouring eNB 620b via backhaul. Cell-specific RRI configuration for both UL and DL can be performed by the serving eNB 620a at 640a and by the neighbouring eNB 620b at 640b. To make the RRI configuration known to the in-cell UEs, broadcasting 642 can be performed by the serving eNB 620a since the information to be delivered can be common to the UEs in the service area. Similarly, the neighbouring eNB 620b can also broadcast the RRI configuration to its in-cell UEs.

As an eNB can have the UL scheduling information for all in-cell UEs, and there can be demodulation reference signals embedded in the UL data transmission from each UE, the eNB may be able to detect the presence of UL inter-cell interference. In some implementations, the eNB can further determine an UL IOI and an UL HII. Further, each base station may broadcast over the air the determined UL IOI and the UL HII. This can be used to replace or supplement the IOI/HII exchange between base stations via backhaul in some instances. In the example 600 shown in FIG. 6, the serving eNB 620a determines UL interference and broadcasts IOI and HII at 644a, and the neighbouring eNB 620b determines UL interference and broadcasts IOI and HII at 644b. By broadcasting IOI and HII over the air, the IOI and HII information can be known to UE 610, and UE 610 in turn can determine if it is likely a UL interfering UE 610 and then take proper measures such as transmitting an RRI to request to avoid causing UL interference to other cells. Note that if an eNB does not schedule or plan to schedule certain physical resource blocks (PRBs), the eNB may not need to indicate any interference overload over PRBs even though high UL interference is detected on those resource blocks (RBs). The reason for that may be an eNB indicating IOI over certain PRBs can trigger interfering UEs (in neighbouring cells) to notify their serving cells to avoid using those PRBs. As such, since those PRBs may be not being used by the eNB anyway, it may not be beneficial to indicate IOI on those PRBs.

Figure 7:
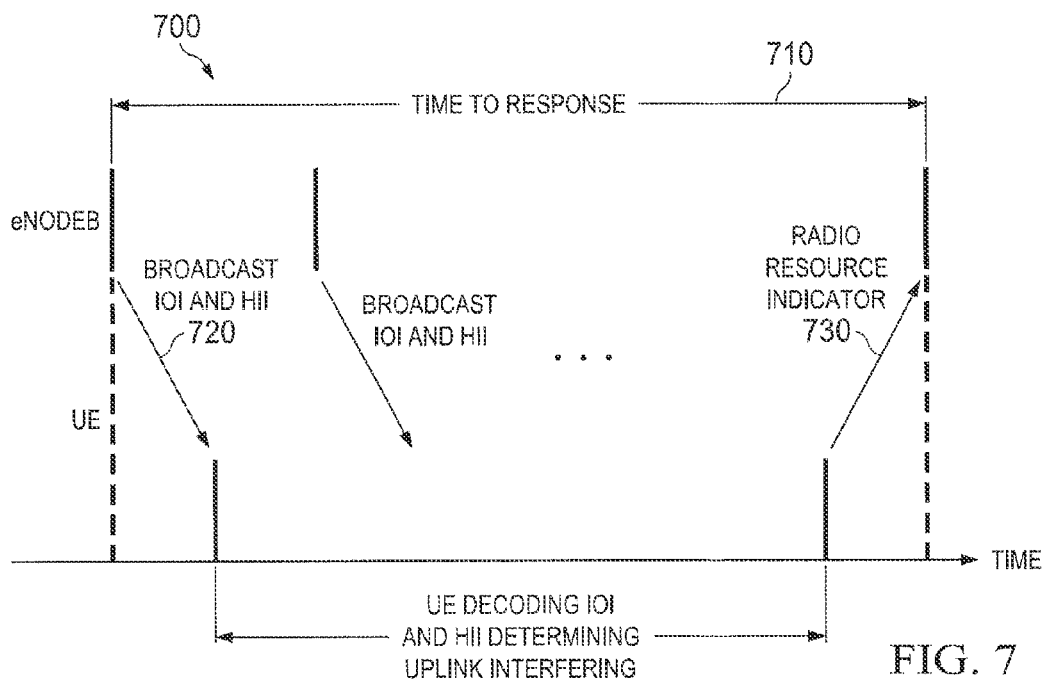
FIG. 7 is a diagram showing an example of time to respond from UE receiving downlink control signals to UE sending RRI.

Turning briefly to FIG. 7, FIG. 7 is a diagram showing an example time to respond from an eNB sending DL control signals to a UE to the eNB receiving an RRI sent by the UE. The time to response 710 from an eNB IOI and HII transmission 720 to a corresponding UE-transmitted RRI 730 delivered to the eNB can be less than 10 ms in some instances, which is much shorter than a typical latency of exchanging IOI and HII over the X2 interface (typically 30 ms to 100 ms).

In some implementations of the present disclosure, UL interference management may be based on an interfering UE requesting its serving eNB to schedule the UE in a preferred set of PRBs, once this UE determines that UL interference is likely caused by the UE at neighbouring eNBs. A fast time to response here may result from the UE notifying its serving eNB quickly and the serving eNB may be expected to react quickly by scheduling the interfering UE in the PRBs that may not cause UL interference at neighbouring eNBs. In some instances, there may be a sudden interference power change seen by neighbouring eNBs in the previously interfered PRBs due to UL interference coordination. For example, a higher sudden interference power change may happen to an eNB when all interfering UEs in neighbouring cells are at once moved out of the interfered PRBs. However, this may not cause a problem on interference detections at eNBs. Firstly, some implementations do not require neighbouring eNBs to detect quickly the sudden interference power change and declare quickly no interference on the previously interfered PRBs. Secondly, the neighbouring eNBs can take their time to estimate interference as an eNB may determine IOI and HII based on averaging of interference across more than one subframe. While eNBs take their time to detect interference and refresh interference indicators, UEs may perform interference-free UL transmissions.

In some implementations, UL interference coordination may be based on UEs providing their radio resource preference to advise eNBs' radio resource scheduling. The eNBs may still be in full control of scheduling and interference detection. The eNBs can anticipate an interference power change based on the RRIs sent from UEs, and/or adjust their interference detection algorithms based on an anticipated potential sudden interference power change to detect the presence of interference quickly and declare no interference slowly. In some implementations, the IOI and HII broadcast over the air can convey essentially the same information as the corresponding indicators on the X2 interface, although they may not necessarily have exactly the same format.

In some instances, the size of the broadcast IOI and HII may be one bit per RB in the system bandwidth, or possibly one bit per 2-4 RBs, depending upon the number of bits which can be broadcast and the number of RBs in the system bandwidth. It may be possible to broadcast IOI and/or HII on the E-UTRA Physical Downlink Control Channel (PDCCH) using a new Downlink Control Information (DCI) format. Receiving and decoding a neighbouring cell's PDCCH can be an easier task for a UE than having to receive the entire E-UTRA Physical Downlink Shared CHannel (PDSCH). In some implementations, such a new DCI format may have the same length as existing DCI formats 0, 1A, and 3/3A (which are all already the same in length). This may result in not increasing the amount of required PDCCH blind decoding by the UE in the event that it may receive IOI/HII information from its serving cell, since the length of DCI formats 0/1A/3/3A may already be scheduled to be searched for via blind decoding by a UE, regardless of which transmission mode the UE is currently configured for. This new DCI may be addressed to a predefined Radio Network Temporary Identifier (RNTI) value taken from one of the reserved values in the range from FFF4 to FFFD (see Table 7.1-1 in 3GPP TS36.321), so that the DCI can easily be identified and differentiated from other PDCCH contents. If one DCI is insufficient to carry both the IOI and HII information together, then a possible solution may be to use two DCIs (which can both be of the same size). A UE can determine whether a detected DCI corresponds to IOI or HII by either associating different RNTIs for each of the two possibilities, or including a binary flag or similar signalling field within the DCI to indicate whether the DCI represents IOI or HII information.

In some implementations, the IOI and HII information can be broadcast in the same pre-specified location on the PDSCH, so that a UE can know when and where to look for it without needing to first decode a corresponding PDCCH. One possible location can be RB 0. Other possible locations can be in one or more of the RBs which carry the E-UTRA Physical Broadcast Channel (PBCH), which carries the E-UTRA Master Information Block (MIB). These RBs can be located next to the E-UTRA Primary Synchronization Signal (PSS) which may make them easier to detect. In some instances, the PSS may also be used to assist channel estimation. In some implementations, the IOI and HII can also be included in an existing E-UTRA System Information Block (SIB) or broadcast in a new SIB.

Returning back to the illustration of FIG. 6. On the UE 610 side, at 622, the presence of DL inter-cell interference can be determined at a UE 610. The UE 610 can decide whether DL interference is present at 624. If the UE 610 can detect the presence of DL inter-cell interference, at 634, it may send to its serving base station information descriptive of a UE-preferred DL radio resource set and a corresponding UL radio resource set (RRI). Both sets may be chosen together by a dedicated combined DL/UL RRI. Note that the RRI sent by a UE can indicate a DL radio resource set and a corresponding UL radio resource set. If the UE 610 does not observe any DL inter-cell interference, at 626, the UE 610 can decode the IOI based on the broadcast information from neighbouring eNB 620*b* at 644*b*. At 628, the UE 610 can make a decision on whether its UL signal may have caused UL interference at the neighbouring eNB 620*b* based on the decoded IOI information.

In a general aspect, a UE can determine if it is one of the UEs that likely caused UL interference to one or more neighbouring cell by reading the IOIs from the broadcast information, and checking its UL scheduling history. If, within a recent time window, a UE frequently used the PRBs indicated by IOI from a neighbouring eNB, and used those PRBs with a transmit power larger than a threshold, it is likely that UE may contribute to the UL interference seen at the neighbouring eNB.

In some instances, having a UE to decide whether it may cause UL interference may result in a fast turn-around time. IOI information exchange between eNBs over the X2 interface may take 20 ms or more (depending on the network topology), while broadcasting IOI and waiting for UE's RRI may take 4 ms (or less). A fast turn-around time can result in the network reacting to interference blocking situations quickly.

In some instances, from the UL scheduling coordination point of view, in addition to knowing IOIs and/or HIIs of other eNBs, an eNB may want to know tentative scheduling decisions done at other eNBs so that the eNB can act accordingly. Since each eNB may receive IOIs from more than one neighbouring eNB, it may be difficult for an eNB to predict the tentative scheduling decision done at its neighbouring eNBs. Having a UE reading IOIs from neighbouring eNBs and sending a RRI to report preferred radio resource(s) and defining a general scheduling rule on how eNBs should respond to the received RRIs, the eNBs that can decode the RRI may infer the tentative scheduling decisions to be done at other eNBs and they may be able to react accordingly and facilitate the UL scheduling coordination.

If the UE 610 can determine that it may cause UL interference at neighbouring eNB 620*b*, it may proceed to 634 where the UE 610 can send to its serving base station 620*a* an RRI. Otherwise, the UE 610 can decode the HII at 630, based on the broadcast information from neighbouring eNB 620*b*. At 632, the UE 610 can decide whether it may be using the PRBs that overlap with the neighbouring cell UL radio resources sensitive to high interference based on the decoded HII. If yes, the UE 610 may send an RRI at 634, otherwise, the UE 610 may end the UE 610 side UL interference coordination process at 636.

In a general aspect, the cell-edge UEs may be responsible for both causing and being affected by UL interference. Cell-centre UEs may be less of an issue in inter-cell interference management. In some instances, a UE can self-identify itself as a cell-edge UE by comparing the relative signal strengths from the serving eNB and neighbouring eNB(s). In some implementations, a UE may consider at least one strongest neighbouring eNB for this comparison. As such, if a UE does not identify itself as a cell-edge UE, it may not take action on monitoring the IOI and/or HII, since it may not generate significant UL interference at neighbouring eNB(s). If a UE is a cell-edge UE, it may monitor IOI and/or HII for at least one neighbouring eNB which has the strongest signal detected at the UE. In some implementations, a cell-edge UE may only monitor IOI and/or HII when the UE's UL traffic load is above a certain threshold. For example, if a cell-edge UE is primarily in DRX or making intermittent UL transmissions, the UL traffic load may be lower than a certain threshold. Thus, the UE may be unlikely to cause much UL interference. In some instances, an eNB can broadcast a UE transmit power per RB threshold and/or a time advance threshold. A UE may monitor IOI if its transmit power per RB and/or its time advance exceeds at least one of the thresholds. The time advance may specify the time difference between boundaries of uplink and downlink subframes as observed at the UE, and can be used to estimate the UE's approximate distance from the eNB.

In some implementations of the current disclosure, a UE may be able to simultaneously decode one or more IOIs and HIIs from one or more eNBs. Multiple eNBs may also indirectly communicate IOI and HII information via UEs. Decoding multiple IOIs and HIIs from eNBs may be possible even in the presence of potential carrier frequency offset between different eNBs and time of arrival (ToA) difference between DL signals and processing power limit at the UE. To be specific, for carrier frequency offset between different eNBs, normally, the absolute frequency error requirement is ±0.05 ppm, ±0.1 ppm, and ±0.25 ppm, for a wide area base station, local area base station, and home base station, respectively. In an particular example, assume a carrier frequency of a local area base station is 2 GHz, the frequency error requirement can be within ±0.1 ppm×2 GHz, i.e., ±200 Hz, which results in, between two base stations, at most 400 Hz carrier frequency offset, which is less than 3% of the 15 KHz subcarrier spacing in LTE. If we assume that IOI and HII are modulated using BPSK or QPSK, the performance degradation caused by frequency error is tolerable at a UE. A UE may ignore the potential carrier frequency offset between the serving eNB and neighbouring eNBs and accept a potential performance degradation (This may also be the case during soft handoff in CDMA, or the case to support network MIMO in LTE-Advanced) or may perform a frequency offset correction for the signals from each base station at baseband. For ToA difference between DL signals from different eNBs, if a TOA difference is larger than the cyclic prefix being used, separate fast Fourier transform (FFT) processing at the receiver may be performed. To decode the IOIs and HIIs from other eNBs, a UE may do extra baseband processing and that extra baseband processing may consume extra power, which however is relatively small as compared with the power consumption in the RF transceiver section.

Returning to the illustration of FIG. 6, back to the eNB side, the RRI from the UE 610 may be intended to the serving eNB 620*a*, however, the neighbouring eNB 620*b* may eavesdrop on the RRI at 646. Similar to the process illustrated in the description of FIG. 3, upon the reception of RRIs from the UE 610, the serving eNB 620*a* and the neighbouring eNB 620*b* can perform DL and UL scheduling accordingly. In particular, at 648*a*, for the in-cell UEs reporting RRIs, the serving eNB 620*a* may try to allocate to the in-cell UEs within the next T_RRI subframes the DL and UL resources requested by the RRIs from the in-cell UEs. For the neighbouring-cell UEs reporting RRIs to the neighbouring eNB 620*b*, the RRIs can be eavesdropped and decoded at the serving eNB 620*a*. At 650*a*, the serving eNB 620*a* can use those decoded RRIs as constraints within the next T_RRI subframes when the serving eNB 620*a* may allocate DL and UL resources for the in-cell UEs that are not reporting RRIs. More specifically, for the DL scheduling, the constraints may be used to avoid using the DL radio resources requested by the dedicated RRIs from neighbouring-cell UEs or to use those with DL transmit power change limited as indicated in the dedicated RRIs from neighbouring-cell UEs. For the UL scheduling, the constraints may be used to avoid using the UL radio resources requested by the dedicated RRIs from neighbouring-cell UEs or to use those for the in-cell UEs that can tolerate potential UL inter-cell interference. In some instances, a dedicated RRI can carry a field for a DL transmit power change limit. The process for the serving eNB 620*a* ends at 652*a*. The neighbouring eNB 620*b* can perform substantially similar operations with, respectively 648*a*, 650*a* and 652*a*, at 648*b*, 650*b* and 652*b*.

Figure 8:
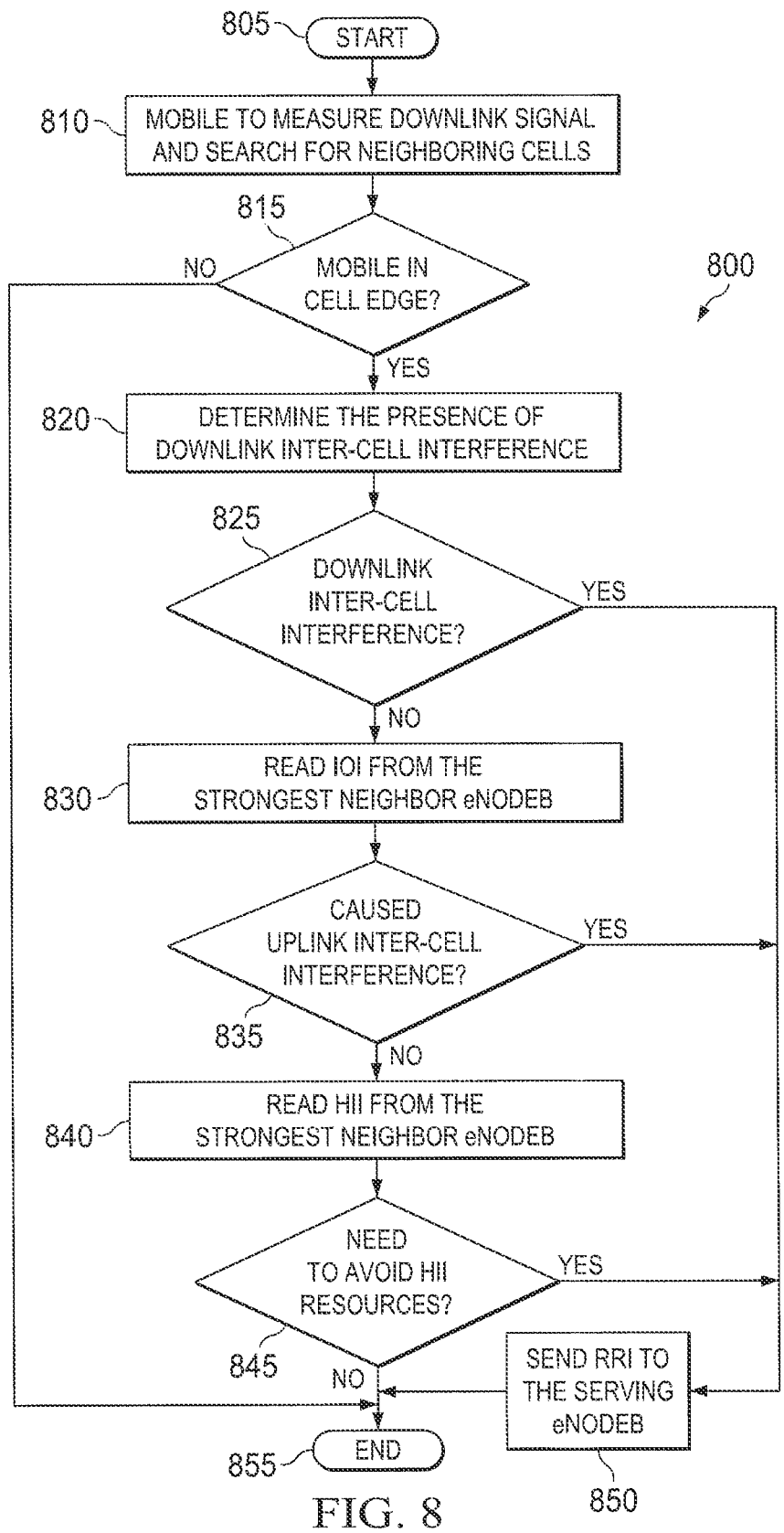
FIG. 8 is a diagram showing an example process of UE sending a dedicated combined downlink/uplink RRI based on downlink interference and control signals for uplink interference management.

FIG. 8 is a diagram showing an example process 800 of UE sending dedicated combined downlink/uplink RRI based on downlink interference and control signals for uplink interference management. The example process 800 starts at 805. At 810, a UE may measure DL signals and search for neighbouring base stations. At 815, the UE may check reference signal received power (RSRP), the presence of neighbouring cells, the per RB transmit power, and/or the amount of time advance to determine whether it is a cell-edge UE. The process ends at 855 if the UE determines it may not be a cell-edge UE. Otherwise, at 820, the UE can check the presence of DL inter-cell interference, and make a decision on whether there is DL inter-cell interference at 825. In the presence of DL inter-cell interference, the UE may send an RRI to the search eNB at 850. Otherwise, the UE may decode IOI from at least one strongest neighbouring eNB at 830 to determine if the UE may have caused any UL inter-cell interference. The decision on whether the UE has caused UL inter-cell interference is made at 835. If yes, the UE can send an RRI to the serving base station to request a preferred DL radio resource set for the upcoming DL transmission and a corresponding UL radio resource set for the upcoming UL transmission at 850. Otherwise, the UE can decode the HII from at least one strongest neighbouring eNB at 840 and decide at 845 whether there is any RB in the neighbouring eNB that is sensitive to UL interference and may need to be avoided. If yes, the UE may proceed to send an RRI to the serving base station at 850 to request to avoid using the resource blocks indicated in HII that may be different from those specified by the RRI. Otherwise, the process ends at 855.

Figure 9:
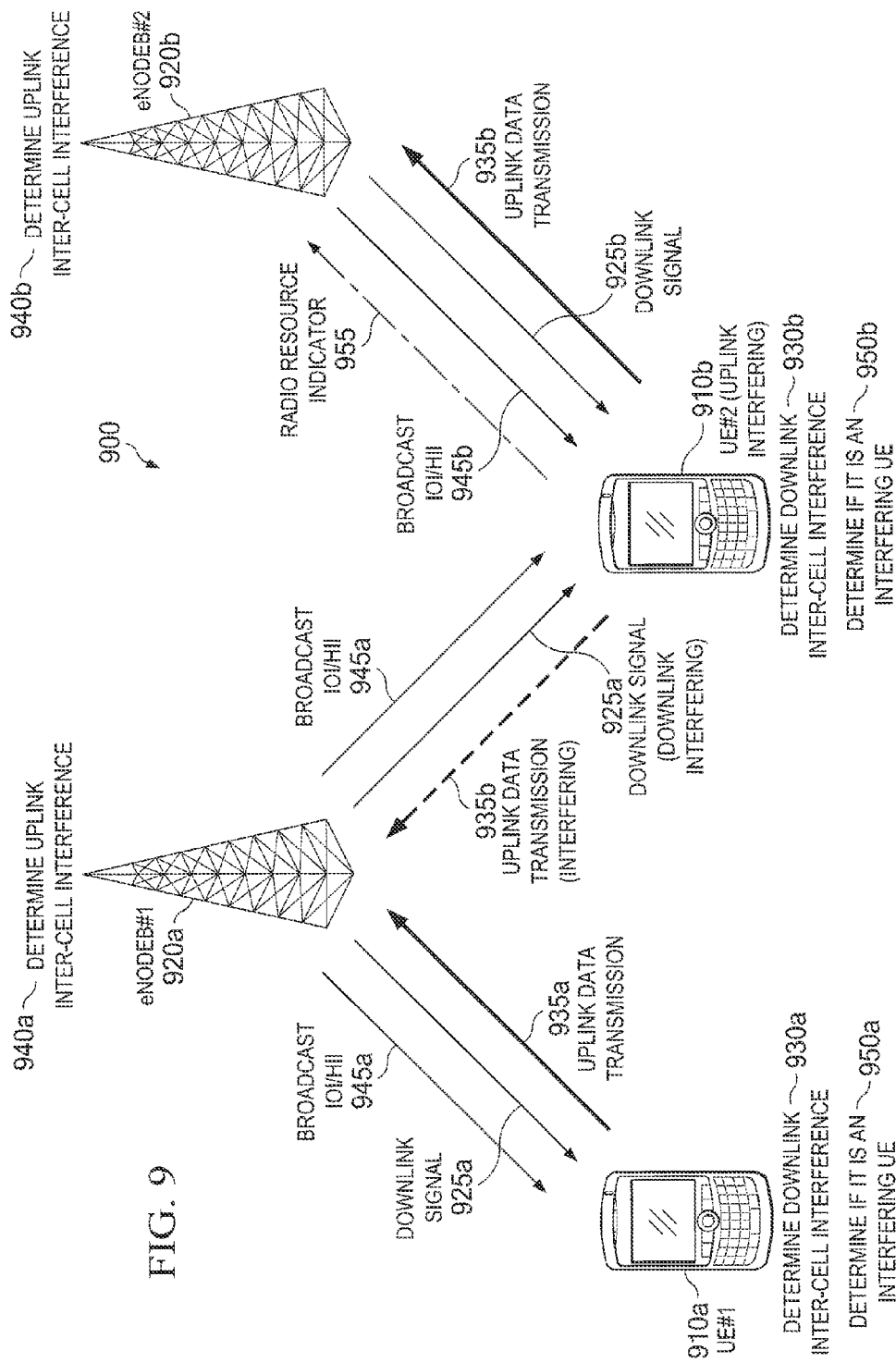
FIG. 9 is a diagram showing an example of uplink interference coordination, where UE sends a dedicated combined downlink/uplink RRI.

FIG. 9 is a diagram showing an example 900 of uplink interference coordination, where UE sends dedicated combined downlink/uplink RRI. There are two UEs and two eNBs shown in this example 900, i.e., UE 910*a*, UE 910*b*, eNB 920*a* and eNB 920*b*. UE 910*a* is served by eNB 920*a*, and is far away from eNB 920*b* relative to eNB 920*a*. As such, the UL interference caused by UE 910*a* at eNB 920*b* may be negligible. UE 910*b* is located at the cell-edge between eNB 920*a* and eNB 920*b* and is served by eNB 920*b*. Since UE 910*b* is similarly located relative to both eNB 920*a* and eNB 920*b*, if the UL/DL radio resources are reused by eNB 920*a* and eNB 920*b*, eNB 920*a* may cause DL interference at UE 910*b*, and UE 910*b* may cause UL interference at eNB 920*a*. In the example coordination process 900, eNB 920*a* can broadcast DL signal and the RRI configuration at 925*a*, and eNB 920*b* broadcasts DL signal and the RRI configuration at 925*b*. UE 910*a* and UE 910*b* may determine the presence of DL inter-cell interference at 930*a* and 930*b*, respectively. If DL inter-cell interference is not detected, UE 910*a* and UE 910*b* may transmit UL data at 935*a* and 935*b* respectively. At 945*a* and 945*b*, eNB 920*a* and eNB 920*b* may broadcast IOI and HII over the air, respectively. At 950*a* and 950*b*, UE 910*a* and UE 910*b* listen to IOI and HII for all PRBs from both eNB 920*a* and eNB 920*b*, respectively, and determine, based on their respective UL data transmission histories, if they are interfering UEs that likely caused UL interferences. Based on the results from both the DL interference detection and the interfering UE determination, UE may send a dedicated RRI for both DL and UL inter-cell interference coordination. In the example illustrated in FIG. 9, UE 910*b* can detect DL interference from eNB 920*a* and it may cause UL interference to UEs served by eNB 920*a* based on decoding IOI and HII. In comparison, UE 910*a* does not detect any DL interference and it may determine that it may not be an UL interfering UE. As such, at 955, UE 910*b* can send an RRI to eNB 920*b*. However, UE 910*a* may not send any RRI.

Figure 10:
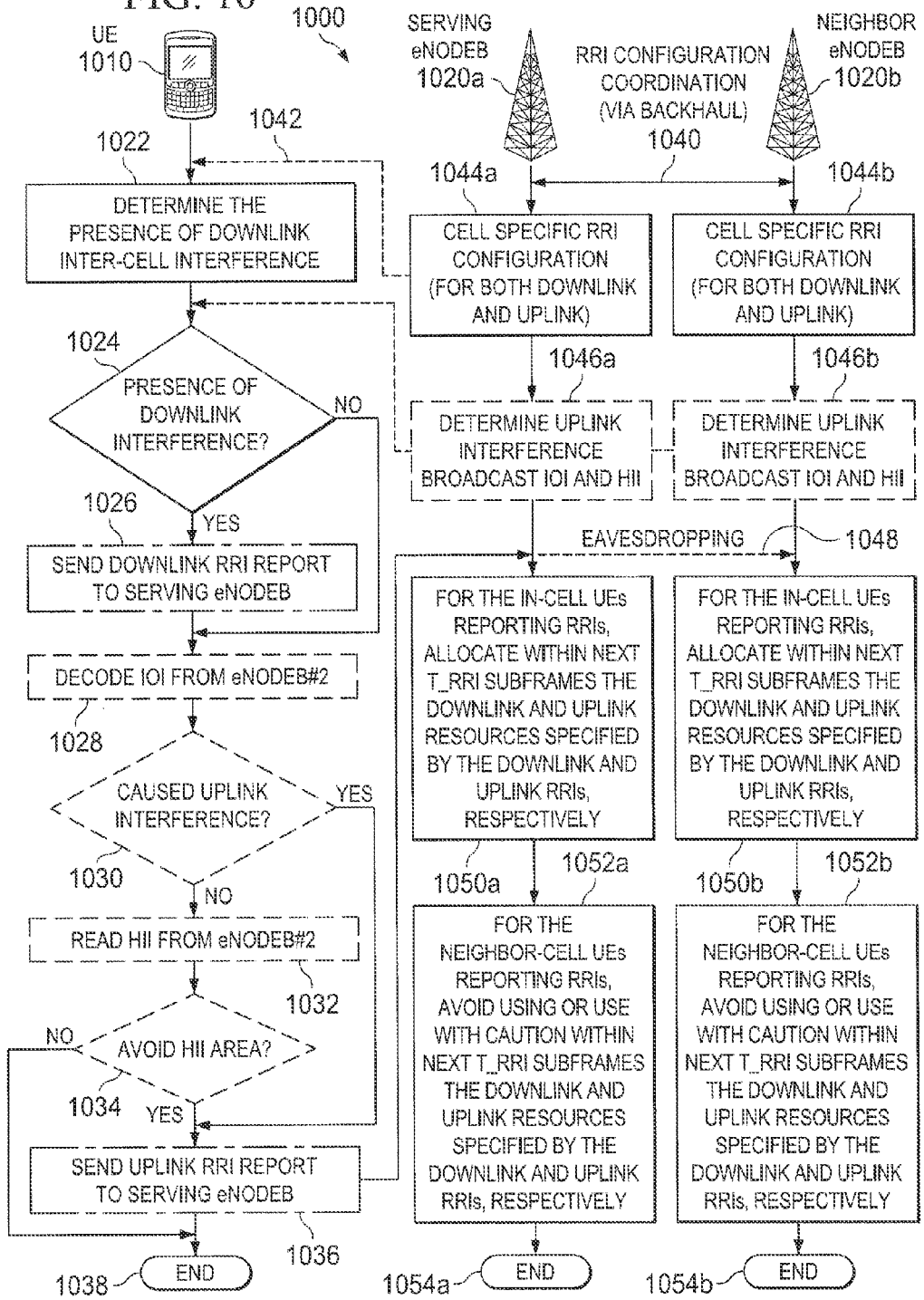
FIG. 10 is a diagram showing an example process of UE sending independent downlink and uplink RRI.

FIG. 10 is a diagram showing an example process 1000 of UE sending independent downlink and uplink RRI. In this example, an independent UL RRI may be sent so that a UE 1010 can trigger eNBs to do UL interference coordination instead of a combination of DL and UL interference coordination. The example process 1000 may be performed when the UE 1010 can detect no DL inter-cell interference but the UE may cause UL inter-cell interference based on identifying the broadcast IOI and HII. In this implementation, UL interference management may also be achieved by using the UE-transmitted RRI. Similar to the example shown in FIG. 3, in this example 1000, the UL signal transmitted from UE 1010 intended to its serving eNB 1020a may cause interference at neighbouring eNB 1020b. Note that although only one neighbouring eNB 1020b is shown in this example 1000, there may be multiple neighbouring eNBs experiencing UL interference from the UE 1010. Similar to the examples shown in FIG. 3 and FIG. 6, each cell may have one or more sets of UE-preferred UL radio resources. At 1040, the RRI configuration coordination is performed at the serving eNB 1020a and the neighbouring eNB 1020b via backhaul. Cell-specific RRI configuration for both UL and DL can be performed by the serving eNB 1020a at 1044a and by the neighbouring eNB 1020b at 1044b. To make the RRI configuration known to the in-cell UEs, broadcasting 1042 can be performed by the serving eNB 1020a since the information to be delivered can be common to the UEs in the service area. Similarly, the neighbouring eNB 1020b can also broadcast the RRI configuration to its in-cell UEs.

At 1046a, the serving eNB 1020a can determine the presence of UL interference and broadcast IOI and HII. The neighbouring eNB 1020b can determine UL interference and broadcast IOI and HII at 1046b. By broadcasting IOI and HII over the air, the IOI and HII information can be known to UE 1010, and UE 1010 in turn can determine if it is a UL interfering UE and then take proper measures such as transmitting an RRI to avoid causing UL interference to other cells.

On the UE 1010 side, at 1022, the presence of DL inter-cell interference can be determined at a UE 1010. The UE 1010 can decide whether there is presence of DL interference at 1024. If the UE 1010 can detect the presence of DL inter-cell interference, at 1026, it may send to its serving base station a separate DL RRI. If the UE 1010 does not see any DL inter-cell interference or in addition to UE 1010 sending a DL RRI to its serving base station, at 1028, the UE 1010 can decode the IOI based on the broadcast information from neighbouring eNB 1020b at 1046b. At 1030, the UE 1010 can make a decision on whether its UL signal may have caused UL interference at the neighbouring eNB 1020b based on the decoded IOI information and its UL data transmission history. If the UE 1010 can determine that it may cause UL interference at neighbouring eNB 1020b, it may proceed to 1036 where the UE 1010 can send to its serving base station 1020a an independent UL RRI. Otherwise, the UE 1010 can decode the HII at 1032, based on the broadcast information from neighbouring eNB 1020b. At 1034, the UE 1010 can decide whether it may be using the PRBs that overlap with the neighbouring cell UL radio resources sensitive to high interference based on the decoded HII and there is a set of UL resources specified by UL RRI configuration available to avoid those HII PRBs. If yes, the UE 1010 may send the UL RRI at 1036, otherwise, the UE 1010 may end the UE 1010 side UL interference coordination process at 1038.

Back to the eNB side, the RRI from the UE 1010 may be intended to the serving eNB 1020a, however, the neighbouring eNB 1020b may eavesdrop on the RRI at 1048. Similar to the process illustrated in the description of FIG. 3, upon the reception of RRIs from the UE 1010, the serving eNB 1020a and the neighbouring eNB 1020b can perform DL and UL scheduling accordingly. In particular, at 1050a, for the in-cell UEs reporting RRIs, the serving eNB 1020a may try to allocate to the in-cell UEs within the next T_RRI subframes the DL and UL resources requested by the RRIs from the in-cell UEs. For the neighbouring-cell UEs reporting RRIs to the neighbouring eNB 1020b, the RRIs can be eavesdropped and decoded at the serving eNB 1020a. At 1052a, the serving eNB 1020a can use those decoded RRIs as constraints within the next T_RRI subframes when the serving eNB 1020a may allocate DL and UL resources for the in-cell UEs that are not reporting RRIs. The process for the serving eNB 1020a ends at 1054a. The neighbouring eNB 1020b can perform substantially similar operations with respectively, 1050a, 1052a and 1054a, at 1050b, 1052b and 1054b.

In some implementations, due to the use of independent RRI, it may also be possible for an eNB to define an independent UL RRI configuration.

Figure 11:
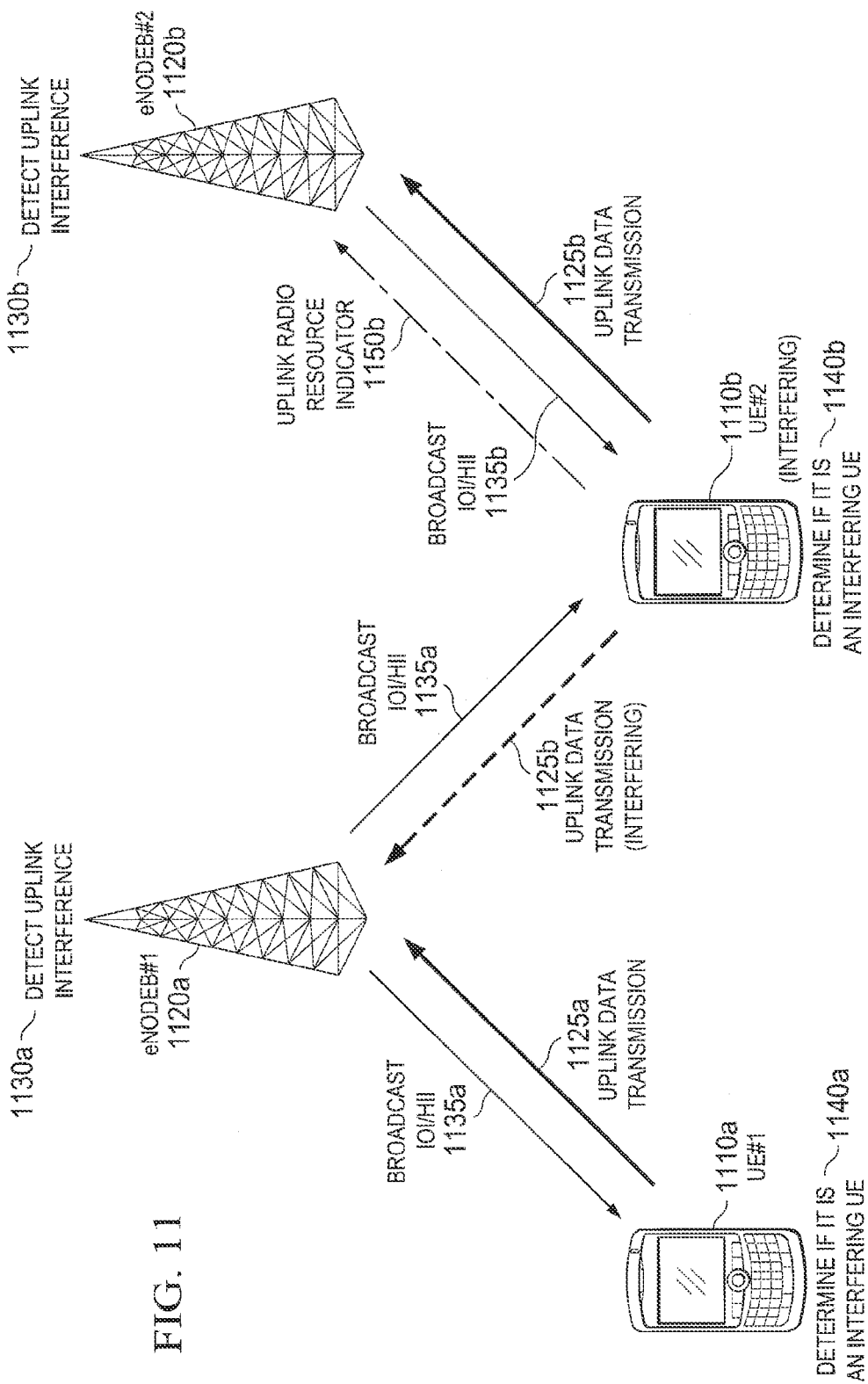
FIG. 11 is a diagram showing an example of uplink interference coordination, where UE sends independent downlink and uplink RRI.

FIG. 11 is a diagram showing an example 1100 of uplink interference coordination, where UE sends independent downlink and uplink RRI. There are two UEs and two eNBs shown in this example 1100, i.e., UE 1110a, UE 1110b, eNB 1120a and eNB 1120b. UE 1110a is served by eNB 1120a, and is far away from eNB 1120b relative to eNB 1120a. As such, the UL interference caused by UE 1110a at eNB 1120b may be negligible. UE 1110b is located at the cell-edge between eNB 1120a and eNB 1120b and is served by eNB 1120b. Since UE 1110b is relatively close to eNB 1120a compared to eNB 1120b, if the UL/DL radio resources are reused by eNB 1120a and eNB 1120b, eNB 1120a may cause DL interference at UE 1110b, and UE 1110b may cause UL interference at eNB 1120a. In the example coordination process 1100, UE 1110a and UE 1110b may transmit UL data at 1125a and 1125b respectively. eNB 1120a and eNB 1120b can detect whether there is UL interference at eNB 1120a and eNB 1120b, respectively, at 1130a and 1130b. At 1135a and 1135b, eNB 1120a and eNB 1120b may broadcast IOI and HII over the air, respectively. At 1140a and 1140b, UE 1110a and UE 1110b listen to IOI and HII for all PRBs from both eNB 1120a and eNB 1120b, respectively, and determine, based on their respective UL data transmission histories, if they are interfering UEs that may have caused UL interference. Based on the results from both the DL interference detection and the interfering UE determination, UE 1110b may send a dedicated RRI for UL inter-cell interference coordination at 1150b. In the example illustrated in FIG. 11, UE 1110b can detect DL interference from eNB 1120a and it may cause UL interference to UEs served by eNB 1120a based on decoding IOI and HII. In comparison, UE 1110a does not detect any DL interference and it may determine that it may not be an UL interfering UE. As such, at 1150b UE 1110b can send an UL RRI to eNB 1120b. However, UE 1110a may not send any RRI.

In some implementations, a UE may be configured to transmit a periodic Sounding Reference Signal (SRS) to allow the serving eNB to estimate the UL transmission channel. If a UE which is monitoring a neighbouring cell's IOI/HII realizes that interference is occurring in certain UL resource blocks, then the UE can zero-force its SRS transmissions on the PRBs or reduce the SRS transmission power on those PRBs. This may guide the serving eNB to avoid scheduling that cell-edge UE onto those UL RBs, and thus avoid generating UL interference at the neighbouring eNB(s).

Figure 12:
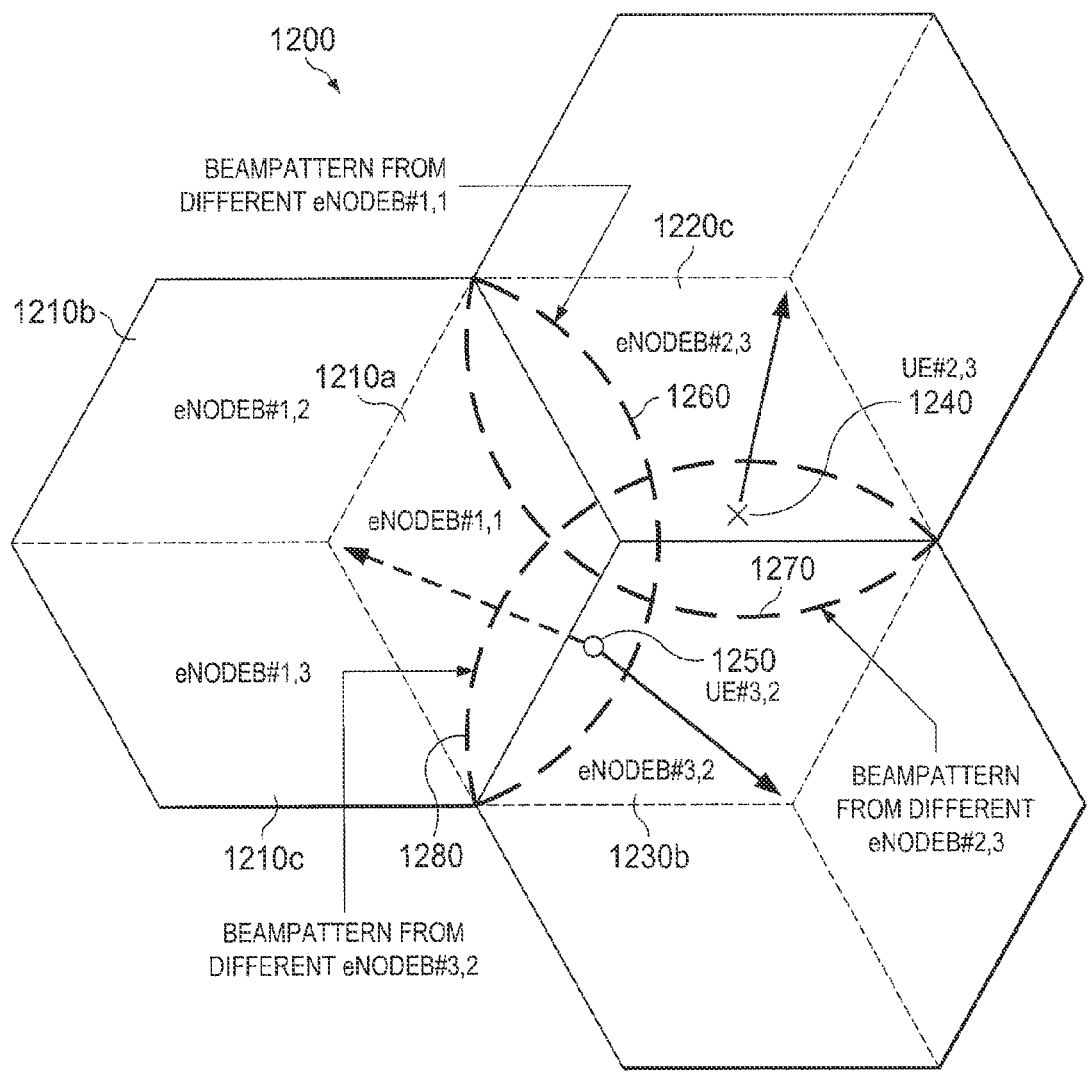
FIG. 12 is a diagram showing an example uplink interference scenario in a network with hexagon cells.

FIG. 12 is a diagram showing an example uplink interference scenario 1200 in a network with hexagonal cells. In this particular implementation 1200, there are nine sectorized cells grouped into three hexagons. Cells within one hexagon can be considered collocated but with different beam coverage. Each cell is with a 120 degree antenna beam. The beam of one cell partially overlaps with the beams of two collocated cells and two non-collated cells. In the example scenario shown, the beam 1260 of eNB 1210*a* partially overlaps with the beams (not shown) from eNB 1210*b* and eNB 1210*c* (collocated eNBs) and partially overlaps with the beam 1270 from eNB 1220*c* and beam 1280 from eNB 1230*b*. Two cell-edge UEs are shown in the example 1200. UE 1240 is in a beam overlap area covered by eNB 1220*c* and eNB 1230*b* and UE 1250 is in a beam overlap area covered by eNB 1210*a* and eNB 1230*b*. It is assumed that UE 1250 can cause interference to the UL reception at eNB 1210*a*. In this example 1200, upon the detection of UL interference at certain PRBs, eNB 1210*a* may broadcast IOIs to indicate the presence of UL interference. Other eNBs may broadcast IOIs to indicate that no UL interference is detected. UE 1250 in the beam overlap area of eNB 1210*a* and eNB 1230*b* may identify DL signals from eNB 1210*a* and thus decode IOIs from eNB 1210*a*, which may happen within less than 4 ms once eNB 1210*a* broadcasts its updated IOIs. UE 1250 may then check its scheduling history to determine if it may be an UL interference-causing UE to eNB 1210*a*. If yes, UE 1250 may send out an UL RRI. eNB 1230*b* may decode the UL RRI from UE 1250 and adjust its UL scheduling for UE 1250 accordingly. eNB 1210*a* may eavesdrop on the UL RRI from UE 1250 and adjust its UL scheduling for other UEs accordingly.

In this example 1200, UE 1240 is in a beam overlapped area between eNB 1220*c* and eNB 1230*b*. UE 1240 may see DL signals from eNB 1230*b* and monitor IOIs from eNB 1230*b*. Since eNB 1230*b* may not indicate any UL interference, no action towards UL interference coordination may be taken by UE 1240.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for managing interference, comprising:
  detecting, by a user device, downlink interference from one or more interfering base stations, the user device operating in a cell of a serving base station different from the one or more interfering base stations;
  receiving, from one or more visible base stations, one or more uplink radio interference indications identifying one or more frequency locations where at least one of uplink interference currently exceeds a first specified threshold or uplink interference is targeted not to exceed a second specified threshold;
  determining, by the user device, the one or more identified frequency locations include transmissions from the user device based, at least in part, on the one or more uplink radio interference indications;
  determining, by the user device, an uplink radio resource set from a plurality of predefined uplink radio resource sets and a downlink radio resource set from a plurality of predefined downlink radio resource sets based, at least in part, on at least one of determining the user device causes uplink interference in at least one of the one or more identified frequency locations or the detected downlink interference; and
  transmitting, to the serving base station, a radio resource indication requesting allocation of the determined uplink radio resource set.

2. The method of claim 1, wherein transmitting a radio resource indication comprises transmitting the radio resource indication in at least one of an uplink control channel or an uplink data channel.

3. The method of claim 1, wherein determining the one or more identified frequency locations include transmissions from the user device comprises:
  comparing an uplink data transmission history of the user device to the one or more frequency locations identified by the one or more uplink radio interference indications; and
  determining the user device causes uplink interference in the one or more identified frequency locations based, at least in part, on a match between the uplink data transmission history and the one or more frequency locations.

4. The method of claim 3, further comprising determining a transmit power associated with the matching uplink data transmission history exceeds a predefined threshold, wherein determining the user device causes uplink interference in the one or more identified frequency locations is also based on the transmit power associated with the matching uplink data transmission history exceeding the predefined threshold.

5. The method of claim 1, wherein the one or more uplink radio interference indications includes at least one of an uplink Interference Overload Indicator (IOI) or an uplink High Interference Indicator (HII).

6. The method of claim 1, wherein the one or more uplink radio interference indications are encoded in a downlink control channel from a neighbouring base station, the method further comprising decoding only the downlink control channel independent of decoding any portion of a downlink data channel from the neighbouring base station.

7. The method of claim 1, wherein the one or more uplink radio interference indications are encoded in a pre-specified portion of a downlink data channel from a neighbouring base station, the method further comprising decoding only the pre-specified portion of the downlink data channel independent of decoding a downlink control channel from the neighbouring base station.

8. User Equipment (UE) for managing interference, comprising:
  memory configured to store a plurality of predefined uplink radio resource sets; and
  one or more processors configured to:
    detect, by a user device, downlink interference from one or more interfering base stations, the user device operating in a cell of a serving base station different from the one or more interfering base stations;
    receive, from one or more visible base stations, one or more uplink radio interference indications identifying one or more frequency locations where at least one of uplink interference currently exceeds a first specified threshold or uplink interference is targeted not to exceed a second specified threshold;

determine, by the user device, the one or more identified frequency locations include transmissions from the user device based, at least in part, on the one or more uplink radio interference indications;

determine, by the user device, an uplink radio resource set from a plurality of predefined uplink radio resource sets and a downlink radio resource set from a plurality of predefined downlink radio resource sets based, at least in part, on at least one of determining the user device causes uplink interference in at least one of the one or more identified frequency locations or the detected downlink interference; and transmit, to the serving base station, a radio resource indication requesting allocation the determined uplink radio resource set.

9. The UE of claim 8, wherein the processors configured to transmit a radio resource indication comprise the processors configured to transmit the radio resource indication in at least one of an uplink control channel or an uplink data channel.

10. The UE of claim 8, wherein the processors configured to determine the one or more identified frequency locations include transmissions from the user device comprise the processors configured to:

compare an uplink data transmission history of the user device to the one or more frequency locations identified by the one or more uplink radio interference indications; and determine the user device causes uplink interference in the one or more identified frequency locations based, at least in part, on a match between the uplink data transmission history and the one or more frequency locations.

11. The UE of claim 10, the processors further configured to determine a transmit power associated with the matching uplink data transmission history exceeds a predefined threshold, wherein determining the user device causes uplink interference in the one or more identified frequency locations is also based on the transmit power associated with the matching uplink data transmission history exceeding the predefined threshold.

12. The UE of claim 8, wherein the one or more uplink radio interference indications includes at least one of an uplink Interference Overload Indicator (IOI) or an uplink High Interference Indicator (HII).

13. The UE of claim 8, wherein the one or more uplink radio interference indications are encoded in a downlink control channel from a neighbouring base station, the UE further comprising decoding only the downlink control channel independent of decoding any portion of a downlink data channel from the neighbouring base station.

14. The UE of claim 8, wherein the one or more uplink radio interference indications are encoded in a pre-specified portion of a downlink data channel from a neighbouring base station, the processors further configured to decode only the pre-specified portion of the downlink data channel independent of decoding a downlink control channel from the neighbouring base station.

* * * * *